(12) United States Patent
Gupta et al.

(10) Patent No.: US 9,218,585 B2
(45) Date of Patent: Dec. 22, 2015

(54) SUPPLY CHAIN MANAGEMENT SYSTEM

(75) Inventors: Manish G. Gupta, St. Louis, MO (US);
Michael J. Higgins, Weldon Spring, MO (US); John Roche, Ballwin, MO (US); Dennis G. Gipson, Chesterfield, MO (US); Brian Hostetler, Chesterfield, MO (US)

(73) Assignee: Hussmann Corporation, Bridgeton, MO (US)

( * ) Notice: Subject to any disclaimer, the term of this patent is extended or adjusted under 35 U.S.C. 154(b) by 1264 days.

(21) Appl. No.: 12/125,734

(22) Filed: May 22, 2008

(65) Prior Publication Data

US 2008/0294488 A1 Nov. 27, 2008

Related U.S. Application Data

(60) Provisional application No. 60/940,231, filed on May 25, 2007.

(51) Int. Cl.
*G06Q 10/00* (2012.01)
*G06Q 10/08* (2012.01)
*G06Q 10/06* (2012.01)

(52) U.S. Cl.
CPC ........ *G06Q 10/087* (2013.01); *G06Q 10/06316* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 3,967,579 | A | 7/1976 | Seiter |
| 4,057,029 | A | 11/1977 | Seiter |
| 4,141,019 | A | 2/1979 | Johnson |
| 4,199,768 | A | 4/1980 | Johnson |

(Continued)

FOREIGN PATENT DOCUMENTS

| | | |
|---|---|---|
| AU | 200015002 | 5/2000 |
| CN | 2255596 | 6/1997 |

(Continued)

OTHER PUBLICATIONS

Australian Patent Office, Official Notice—Decision of a Delegate of the Commissioner of Patents regarding Opposition by Exago Pty Ltd to Application No. 757438 in the name of Ceebron Pty Ltd, dated Mar. 11, 2005, 19 pages.

(Continued)

*Primary Examiner* — Ariel Yu
(74) *Attorney, Agent, or Firm* — Michael Best & Friedrich LLP

(57) ABSTRACT

A method of transporting commodities in a supply chain management system including a supply chain. The method includes providing a database and a network in communication with the database, which is accessible by at least one member of the supply chain via the network. The method also includes providing a container and supporting one or more commodities using the container, assigning at least one sensor to the commodities, sensing a condition of the commodities and generating a signal indicative of the commodity condition, identifying information related to the commodities, acquiring data related to identifying the commodity information, distributing the signal and the acquired data over the network, storing the signal and the acquired data in the database, monitoring the commodities via the network, and managing at least one of storage and transport of the commodities through the supply chain based on the signal and the acquired data.

7 Claims, 1 Drawing Sheet

(56) References Cited

U.S. PATENT DOCUMENTS

| | | | |
|---|---|---|---|
| 4,277,974 A | 7/1981 | Karr et al. | |
| 4,356,702 A | 11/1982 | Kuttel | |
| 4,816,822 A | 3/1989 | Vache et al. | |
| 4,843,956 A | 7/1989 | Lashlee | |
| 4,882,564 A | 11/1989 | Monroe et al. | |
| 4,962,777 A | 10/1990 | Bell | |
| 4,987,745 A | 1/1991 | Harris | |
| 5,117,096 A | 5/1992 | Bauer et al. | |
| 5,231,273 A | 7/1993 | Caswell et al. | |
| 5,313,848 A | 5/1994 | Santin et al. | |
| 5,400,608 A | 3/1995 | Steed et al. | |
| 5,424,720 A | 6/1995 | Kirkpatrick | |
| 5,437,163 A | 8/1995 | Jurewicz et al. | |
| 5,442,669 A | 8/1995 | Medin | |
| 5,686,888 A | 11/1997 | Welles, II et al. | |
| 5,742,039 A | 4/1998 | Sato et al. | |
| 5,835,012 A | 11/1998 | Wilk | |
| 5,867,093 A | 2/1999 | Dodd et al. | |
| 5,869,819 A | 2/1999 | Knowles et al. | |
| 5,872,721 A | 2/1999 | Huston et al. | |
| RE36,200 E | 4/1999 | Berrian et al. | |
| 5,937,364 A | 8/1999 | Westgard et al. | |
| 6,034,355 A | 3/2000 | Naderi et al. | |
| 6,058,374 A | 5/2000 | Guthrie et al. | |
| 6,085,170 A | 7/2000 | Tsukuda | |
| 6,170,748 B1 | 1/2001 | Hash et al. | |
| 6,266,008 B1 | 7/2001 | Huston et al. | |
| 6,285,282 B1 | 9/2001 | Dorenbosch et al. | |
| 6,294,997 B1 | 9/2001 | Paratore et al. | |
| 6,327,576 B1* | 12/2001 | Ogasawara | 705/22 |
| 6,471,125 B1 | 10/2002 | Addy | |
| 6,492,904 B2 | 12/2002 | Richards | |
| 6,512,455 B2 | 1/2003 | Finn et al. | |
| 6,542,114 B1 | 4/2003 | Eagleson et al. | |
| 6,553,336 B1 | 4/2003 | Johnson et al. | |
| 6,563,417 B1 | 5/2003 | Shaw | |
| 6,668,240 B2 | 12/2003 | Singh et al. | |
| 6,675,591 B2 | 1/2004 | Singh et al. | |
| 6,712,276 B1 | 3/2004 | Abali et al. | |
| 6,720,888 B2 | 4/2004 | Eagleson et al. | |
| 6,737,974 B2 | 5/2004 | Dickinson | |
| 6,747,558 B1 | 6/2004 | Thorne et al. | |
| 6,750,771 B1 | 6/2004 | Brand | |
| 6,764,004 B2 | 7/2004 | White | |
| 6,765,484 B2 | 7/2004 | Eagleson et al. | |
| 6,771,183 B2 | 8/2004 | Hunter | |
| 6,817,757 B1 | 11/2004 | Wallace | |
| 6,826,514 B1 | 11/2004 | Antico et al. | |
| 6,843,414 B2 | 1/2005 | Madrid et al. | |
| 6,856,247 B1 | 2/2005 | Wallace | |
| 6,856,932 B1 | 2/2005 | Wallace | |
| 6,865,516 B1 | 3/2005 | Richardson | |
| 6,873,936 B2 | 3/2005 | Reel et al. | |
| 6,876,294 B1 | 4/2005 | Regan | |
| 6,879,962 B1 | 4/2005 | Smith et al. | |
| 6,883,710 B2 | 4/2005 | Chung | |
| 6,892,546 B2 | 5/2005 | Singh et al. | |
| 6,892,943 B2 | 5/2005 | Nakamura | |
| 6,900,731 B2 | 5/2005 | Kreiner et al. | |
| 6,900,732 B2 | 5/2005 | Richards | |
| 6,901,304 B2 | 5/2005 | Swan et al. | |
| 6,915,954 B2 | 7/2005 | Knowles et al. | |
| 6,917,291 B2 | 7/2005 | Allen | |
| 6,934,540 B2 | 8/2005 | Twitchell, Jr. | |
| 6,940,392 B2 | 9/2005 | Chan et al. | |
| 6,945,459 B2 | 9/2005 | Flanagan | |
| 6,982,640 B2 | 1/2006 | Lindsay et al. | |
| 6,989,751 B2 | 1/2006 | Richards | |
| 7,019,638 B1 | 3/2006 | Wallace | |
| 7,024,870 B2 | 4/2006 | Singh et al. | |
| 7,026,929 B1 | 4/2006 | Wallace | |
| 7,027,958 B2 | 4/2006 | Singh et al. | |
| 7,035,856 B1 | 4/2006 | Morimoto | |
| 7,046,148 B2 | 5/2006 | Miyazawa | |
| 7,057,527 B2 | 6/2006 | Hunter | |
| 7,059,515 B2 | 6/2006 | White | |
| 7,075,481 B2 | 7/2006 | Huston et al. | |
| 7,102,564 B2 | 9/2006 | Huston et al. | |
| 7,113,922 B2 | 9/2006 | Fowler | |
| 7,136,832 B2 | 11/2006 | Li et al. | |
| 7,142,110 B2 | 11/2006 | Schmidtberg et al. | |
| 7,142,121 B2 | 11/2006 | Chan et al. | |
| 7,148,800 B2 | 12/2006 | Cunningham et al. | |
| 7,200,132 B2 | 4/2007 | Twitchell, Jr. | |
| 7,209,468 B2 | 4/2007 | Twitchell, Jr. | |
| 7,250,858 B2 | 7/2007 | Schmidtberg et al. | |
| 7,267,270 B2 | 9/2007 | Hopwood et al. | |
| 7,299,125 B2 | 11/2007 | Marks et al. | |
| 7,322,514 B2 | 1/2008 | Lubow | |
| 7,327,260 B2 | 2/2008 | Himberger et al. | |
| 7,348,886 B2 | 3/2008 | Himberger et al. | |
| 7,382,264 B2 | 6/2008 | Rajapakse et al. | |
| 7,394,372 B2 | 7/2008 | Gloekler et al. | |
| 7,397,374 B2 | 7/2008 | Sasaki et al. | |
| 7,405,655 B2 | 7/2008 | Ng et al. | |
| 7,414,571 B2 | 8/2008 | Schantz et al. | |
| 7,427,918 B2 | 9/2008 | Fano | |
| 7,430,437 B2 | 9/2008 | Twitchell, Jr. | |
| 7,495,558 B2* | 2/2009 | Pope et al. | 340/572.1 |
| 2002/0042734 A1 | 4/2002 | Shikida et al. | |
| 2002/0082787 A1 | 6/2002 | Woodworth et al. | |
| 2002/0091593 A1 | 7/2002 | Fowler | |
| 2002/0111819 A1 | 8/2002 | Li et al. | |
| 2002/0116241 A1 | 8/2002 | Sandhu et al. | |
| 2002/0123996 A1 | 9/2002 | O'Brien | |
| 2003/0006907 A1 | 1/2003 | Lovegreen et al. | |
| 2003/0066886 A1 | 4/2003 | Hoffman et al. | |
| 2004/0015418 A1 | 1/2004 | Dooley et al. | |
| 2004/0024644 A1 | 2/2004 | Gui et al. | |
| 2004/0148117 A1* | 7/2004 | Kirshenbaum et al. | 702/82 |
| 2004/0174260 A1 | 9/2004 | Wagner | |
| 2004/0177012 A1 | 9/2004 | Flanagan | |
| 2004/0233055 A1 | 11/2004 | Canich et al. | |
| 2004/0243353 A1 | 12/2004 | Aghassipour | |
| 2004/0263329 A1 | 12/2004 | Cargonja et al. | |
| 2005/0006456 A1 | 1/2005 | White | |
| 2005/0021279 A1* | 1/2005 | Kuepper et al. | 702/127 |
| 2005/0052284 A1 | 3/2005 | Schmidtberg et al. | |
| 2005/0055237 A1 | 3/2005 | Schmidtberg et al. | |
| 2005/0055254 A1 | 3/2005 | Schmidtberg et al. | |
| 2005/0055268 A1* | 3/2005 | Schmidtberg et al. | 705/13 |
| 2005/0055287 A1 | 3/2005 | Schmidtberg et al. | |
| 2005/0088299 A1 | 4/2005 | Bandy et al. | |
| 2005/0134457 A1 | 6/2005 | Rajapakse et al. | |
| 2005/0139663 A1 | 6/2005 | Hopwood et al. | |
| 2005/0151643 A1 | 7/2005 | Rajapakse et al. | |
| 2005/0157774 A1 | 7/2005 | DiLuiso et al. | |
| 2005/0171738 A1 | 8/2005 | Kadaba | |
| 2005/0193222 A1 | 9/2005 | Greene | |
| 2005/0198228 A1 | 9/2005 | Bajwa et al. | |
| 2005/0205674 A1 | 9/2005 | Herrman et al. | |
| 2005/0248454 A1 | 11/2005 | Hanson et al. | |
| 2005/0248455 A1 | 11/2005 | Pope et al. | |
| 2005/0258961 A1 | 11/2005 | Kimball et al. | |
| 2005/0270160 A1 | 12/2005 | Chan et al. | |
| 2005/0289019 A1 | 12/2005 | Chan et al. | |
| 2006/0100939 A1* | 5/2006 | Boyer et al. | 705/28 |
| 2006/0109106 A1 | 5/2006 | Braun | |
| 2006/0145815 A1 | 7/2006 | Lanzieri et al. | |
| 2006/0255934 A1 | 11/2006 | Easley et al. | |
| 2006/0267731 A1 | 11/2006 | Chen | |
| 2007/0011041 A1 | 1/2007 | Bourne | |
| 2007/0022024 A1 | 1/2007 | Dowty et al. | |
| 2007/0030169 A1 | 2/2007 | McNay | |
| 2007/0055584 A1 | 3/2007 | Chelniak et al. | |
| 2007/0067177 A1 | 3/2007 | Martin et al. | |
| 2008/0001748 A1 | 1/2008 | Childress et al. | |
| 2008/0008109 A1 | 1/2008 | Ollis | |
| 2008/0017709 A1 | 1/2008 | Kennedy | |
| 2008/0043804 A1 | 2/2008 | Goldsmith et al. | |
| 2008/0099557 A1 | 5/2008 | James | |
| 2008/0129490 A1 | 6/2008 | Linville et al. | |
| 2008/0154677 A1 | 6/2008 | Casey | |
| 2008/0180249 A1 | 7/2008 | Butler et al. | |

(56) References Cited

U.S. PATENT DOCUMENTS

| | | | |
|---|---|---|---|
| 2008/0186180 A1 | 8/2008 | Butler et al. | |
| 2008/0198001 A1 | 8/2008 | Sarma et al. | |
| 2008/0291033 A1* | 11/2008 | Aghassipour | 340/584 |

FOREIGN PATENT DOCUMENTS

| | | | |
|---|---|---|---|
| CN | 13202381 | 7/2001 | |
| CN | 1390303 | 1/2003 | |
| CN | 1433558 | 7/2003 | |
| CN | 1483643 | 3/2004 | |
| CN | 1529870 | 9/2004 | |
| CN | 1638954 | 7/2005 | |
| CN | 1677429 | 10/2005 | |
| CN | 1698053 | 11/2005 | |
| CN | 1768553 | 5/2006 | |
| EP | 0845747 | 6/1998 | |
| EP | 1111532 | 6/2001 | |
| IN | IN/PCT/2002/01437 A | 1/2005 | |
| IN | 00356/MUMNP/2004 | 4/2005 | |
| IN | 0233/KOLNP/2003 A | 12/2005 | |
| IN | IN/PCT/1999/00004 A | 12/2005 | |
| IN | 00419/KOLNP/2005 A | 2/2006 | |
| IN | 1245/MUM/2004 A | 6/2006 | |
| IN | 01395/MUMNP/2005 A | 6/2006 | |
| JP | 63036116 | 2/1988 | |
| JP | 63263419 | 10/1988 | |
| JP | 03001274 | 1/1991 | |
| JP | 05324672 | 12/1993 | |
| JP | 07021280 | 1/1995 | |
| JP | 08062240 | 3/1996 | |
| JP | 10247112 | 9/1998 | |
| JP | 10289297 | 10/1998 | |
| JP | 10302189 | 11/1998 | |
| JP | 11175617 | 7/1999 | |
| JP | 11240609 | 9/1999 | |
| JP | 11348647 | 12/1999 | |
| JP | 2000250998 | 9/2000 | |
| WO | 9933040 | 7/1999 | |
| WO | 0019392 | 4/2000 | |
| WO | 00/26111 | 5/2000 | |
| WO | 0038024 | 6/2000 | |
| WO | 0046728 | 8/2000 | |
| WO | 0165454 | 9/2001 | |
| WO | 2006051511 | 5/2006 | |
| WO | 2006119123 | 11/2006 | |

OTHER PUBLICATIONS

Ceebron Pty Ltd, Smart-Trace © web page, 2004, Retrieved from http://www.smart-trace.com/about.html, 2 pages.
Infratab web pages, Retrieved from http://www.infratab.com/, published at least as early as May 18, 2006, 10 pages.
Tuttle, J.R., "Traditional and Emerging Technologies and Applications in the Radio Frequency Identification (RFID) Industry," Radio Frequency Integrated Circuits (RFIC) Symposium, 1997, IEEE Jun. 8-11, 1997, pp. 5-8.
Johnston, R.B. et al, "Electronic Data Interchange Using Two Dimensional Bar Code"; Proceedings of the 31st Hawaii International Conference on System Sciences, 1998, vol. 4, Jan. 6-9, 1998, pp. 83-91.
Schoeneman, J.L. et al, "Authenticated Tracking and Monitoring System (ATMS) tracking shipments from an Australian Uranium Mine," Proceedings of the Institute of Electrical and Electronics Engineers 31st Annual International Camahan Conference on Security Technology, 1997, Oct. 15-17, 1997, pp. 231-240.
1999 Global News Wire, "Wave of Success Continues—Vistar Signs Deal with Australian Company," Financial Times Information, Dec. 28, 1999, p. 7 (6 total pages).
Cottrill, K., "Tech Software Delivers; Lower-cost satellites, radio tags taking cargo tracking systems into the future," 1998 Journal of Commerce, Inc., Traffic World, Special Report, May 4, 1998, pp. 2-4.
Farrar, F., "Intermodal Carriers Install New SMART System," 2001 PRIMEDIA Business Magazines & Media Inc., Jan. 2001, pp. 1-3.
Savi Technologies, "Part 1: Active and Passive RFID: Two Distinct, But Complementary, Technologies for Real-Time Supply Chain Visibility," 2002, pp. 1-12, Abridged by Q.E.D. Systems from two white papers created by Savi Technologies: "Active and Passive RFID" and "Selecting the Right Active Frequency."
Wessel, R., "German Baker's RFID Application is Recipe for Success," RFID Journal, Aug. 28, 2006, 3 pages, Retrieved from http://www.rfidjournal.com/article/articleprint/2621/-1/1.
Moore, T., "Off the Wire; Sidebar," Fleet Owner, Nov. 1997, pp. 5-6.
"State of the art," Fleet Owner, Aug. 1997, pp. 7-10.
"Private fleets moving to wireless communications," Fleet Owner, May 1997, pp. 11-14.
Knill, B., "Automation Unifi style; Unifi Spun Yarn Inc," includes related articles, Material Handling Engineering, May 1996, pp. 15-18, Information Access Company, a Thomson Corporation Company; ASAP database, Penton Publishing Inc.
"Calling All Cars; Radio ID tags can report a wealth of information," Automotive News, Jun. 28, 1993, pp. 19-20, Crain Communications, Inc.
Milligan, B., "High-tech tools: Boon for shippers & carriers," Purchasing Magazine, Aug. 12, 1999, pp. 2-6, Cahners Business Information, a division of Reed Elsevier Inc.
Harrington, L.H., "How smart is your fleet? New technology pushes fleets into the 21st century," including related story on routing software, Transportation and Distribution, Aug. 1997, pp. 11-15, Information Access Company, a Thomson Corporation Company; ASAP database, Penton Publishing Inc.
Russell, T.D., "Burlington: toward a rolling warehouse; Mobile Applications," Satellite Communications, Jun. 1990, pp. 16-18, Information Access Company, a Thomson Corporation Company; ASAP database, Cardiff Publishing Company.
Cooke, J.A., "Red flags; Supply chain software vendors are including 'alert messaging' capabilities in their applications. This feature lets logistics managers respond to emergencies before they become crises," Logistics Management, Mar. 31, 2000, pp. 2-4, Cahners Business Information, a division of Reed Elsevier Inc.
"Philippines: Asian Terminals Unveils Online Cargo Tracking System," Computerworld (Philippines), Sep. 5, 2000, pp. 2-3, Financial Times Information; Global News Wire; Computerworld (Philippines).
"India: Vehicle Management, The Smart Way," Business Line, Jul. 17, 2000, pp. 4-6, Financial Times Information; Global News Wire; Kasturi & Sons Ltd.
Takakuwa, Hiroshi, Transport Information Network System by db-1 XP Database Machine, printed in vol. 59, No. 2 of Oki Electric Research and Development, Apr. 1, 1992, pp. 83 and 84, Oki Electric Industry, Co., Ltd.
Fujisawa, "Experimental trial of RFID toward practical use in area of logistics," Proceedings of the Society Conference of IEICE, IC Business Division, Toppan Printing Co., Ltd., 2006, pp. 2-5.
Ogasawara et al., "Traceability temperature management system that utilizes RFID temperature sensor," NEC Technical Journal, 2006, pp. 72-75.
Office Action from the Japan Patent Office for Application No. 2014-039505 dated Feb. 24, 2015 (8 pages).
Manual of growing vegetables and ornamental plants, [online], Aomori Prefecture, Mar. 31, 1996, pp. 260 and 268, http://www.maff.go.jp/j/seisan/kankyo/hozen_type/h_sehi_kizyun/pdf/aomori_yasai08_15.pdf.
Fujisawa, "Experimental trial of RFID toward practical use in area of logistics", Proceedings of the 2006 IEICE Communications Society Conference, Sep. 19, 2006, Kanazawa University, Kanazawa, Japan.
NEC, NEC Technical Journal, NEC Corporation, 2006, No. 2 vol. 59, Japan.

* cited by examiner

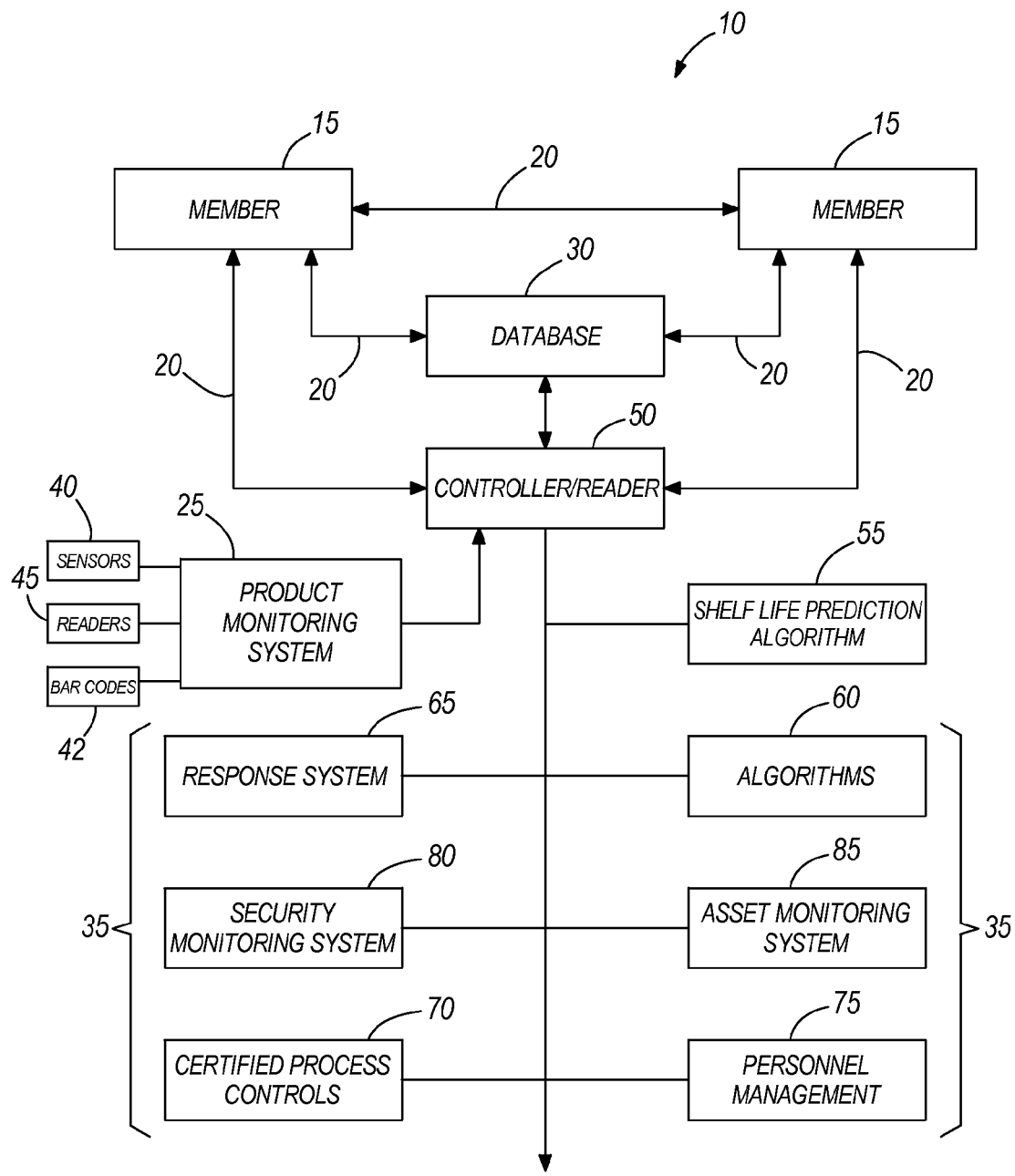

SUPPLY CHAIN MANAGEMENT SYSTEM

RELATED APPLICATIONS

This patent application claims priority to U.S. Patent Application Ser. No. 60/940,231 filed May 25, 2007, the entire contents of which are hereby incorporated by reference.

BACKGROUND

The present invention relates to a supply chain management system. More particularly, the present invention relates to a supply chain management system that tracks and monitors products, personnel, and assets in a supply chain, and that is accessible over a network by one or more members.

Supply and demand commodity chains seek to provide high quality goods to end consumers through management and coordination of services between various participants in the commodity chain. Some products (e.g., food, paint, chemicals, pharmaceuticals, etc.) need to be shipped or transported under predetermined conditions (e.g., temperature, humidity, etc.) to maximize freshness or quality of the product. These products may also be time-sensitive, necessitating quick delivery to an end destination or receiver (e.g., retail store, restaurant, etc.) where an end user (e.g., consumer) may purchase the products. Often, products are shipped over long distances, and can be transferred by land, sea, and/or air in order to reach the retail center within a desired amount of time. In some instances, storage of the products within the commodity chain is necessary to await the next stage in the supply chain. In some commodity chains, the products are not monitored during storage, which can result in damage to or loss of the products.

SUMMARY

In one construction, the invention provides a method of transporting commodities in a supply chain management system including a supply chain. The method includes providing a database and a network in communication with the database. The database is accessible by at least one member of the supply chain via the network. The method also includes providing a container and supporting one or more commodities using the container for transport through the supply chain, assigning at least one sensor to the commodities supported by the container, and sensing at least one condition of the commodities using the sensor and generating a signal indicative of the at least one commodity condition. The method also includes identifying information related to the commodities supported by the container, acquiring data related to identification of the information related to the commodities from the sensor, distributing the signal indicative of the at least one commodity condition and the acquired data over the network, and storing the signal and the acquired data in the database. The method also includes monitoring the commodities throughout the supply chain via the network, and managing at least one of storage and transport of the commodities through the supply chain based on the signal and the acquired data.

In another construction, the invention provides a method that includes providing a database and a network in communication with the database. The database is accessible by one or more members of the supply chain via the network. The method also includes transporting a commodity through the supply chain, monitoring characteristics of the supply chain associated with the commodity using at least one sensor, providing a controller in communication with the database and the sensor via the network, the controller including a shelf life prediction algorithm, acquiring data representative of the characteristics of the supply chain from the sensor, the acquired data including at least one of historical data, current data, and expected conditions, and storing the acquired data in the database. The method also includes predicting a shelf life of the commodity using the shelf life prediction algorithm based on the data acquired from the sensor, storing the predicted shelf life of the commodity in the database, providing an input device in communication with the database via the network, and retrieving the predicted shelf life from the database over the network via the an input device.

In yet another construction, the invention provides a method that includes providing a transportation system that includes a process control system that has process controls for managing the commodities during at least one of storage and transport of the commodities through the supply chain, implementing the process controls of the process control system, and determining criteria associated with at least one of storage and transport of the commodities in the supply chain using the process controls. The method also includes maintaining the commodities within predetermined conditions based on the criteria determined by the process controls, arranging the commodities for transport based on the determined criteria, and moving the arranged commodities through the supply chain using the transportation system.

In yet another construction, the invention provides a method that includes providing a database and a network in communication with the database. The database includes predetermined conditions that are associated with one or more commodities to be transported through the supply chain, and is accessible by one or more members of the supply chain via the network. The method also includes assigning at least one sensor to the commodities, monitoring at least one condition of the commodities using the sensor, communicating data representative of the at least one commodity condition to the database via the network, and storing the communicated data in the database. The method also includes providing a process control system including process controls, implementing the process controls to determine one or more operating parameters associated with at least one storage and transport of the commodities in the supply chain, and managing the at least one commodity condition throughout the supply chain based on the stored data and the predetermined operating parameters. The method also includes monitoring assets of the supply chain using the process controls, managing the assets via the network, monitoring personnel management in the supply chain using the process controls, managing the personnel management via the network, managing the commodities during at least one of storage and transport in the supply chain based on the predetermined operating parameters, and maintaining the commodities within the predetermined conditions.

In yet another construction, the invention provides a method of trading commodities in a supply chain that includes providing a database and a network in communication with the database. The network includes a plurality of members of the supply chain, and the database is accessible by one or more of the plurality of members via the network. The method also includes moving commodities through the supply chain, assigning at least one sensor to the commodities, and monitoring at least one condition of the commodities using the sensor. The method also includes communicating data representative of the at least one commodity condition to the database via the network, storing the data in the database, implementing a trading system via the network, and trading commodities within the supply chain using the trading system.

In yet another construction, the invention provides a method of operating a supply chain management system including a supply chain. The method includes providing a database and a network in communication with the database. The network includes a plurality of members of the supply chain and an online access system, and the database is accessible by one or more of the plurality of members via the network. The method also includes moving one or more commodities through the supply chain, assigning at least one sensor to the commodities, and monitoring at least one condition of the commodities using the sensor. The method also includes communicating data representative of the at least one condition of the commodities to the database via the network, storing the data in the database, enabling access to the database by a consumer via the online access system, and tracking in near real-time at least one of a history and a predicted shelf life of the commodities using the online access system.

Aspects of the invention will become apparent by consideration of the detailed description and accompanying drawings.

BRIEF DESCRIPTION OF THE DRAWINGS

FIG. 1 is a schematic flow chart of an exemplary commodity management system.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIG. 1 shows a commodity management system 10 used to monitor and control various aspects of products or goods or perishable commodities in a supply chain from creation to final distribution. The management system 10 is accessible by various members 15 of the supply chain that are associated with the products to be shipped and received. The members 15 include suppliers, packaging and processing centers, transportation systems, distribution centers, and receivers (e.g., retail store, restaurant, etc.). In some constructions, the members 15 can also include auditors, and brokers or financial institutions (e.g., insurance company, bank, etc.). In other constructions, other ancillary participants can be members 15 (e.g., customs and quarantine authorities, freight forwarders, exporters, importers, government agencies, consolidators, terminal operators, ground handlers, ramp handlers, emergency services, information providers, depot operators, port authorities, manufacturers, consumers, etc.). The quantity and types of members 15 listed above are not exhaustive, and other participants of the management system 10 are considered.

The management system 10 includes a network 20, a product or commodity monitoring system 25, a data center or database 30, and a process control system 35. The network 20 is in communication with each member 15, the product monitoring system 25, and the database 30 to provide communication between various components of the management system 10. The network facilitates acquisition and distribution of information or data related to products in the supply chain. The information can include sensed conditions of the products in the supply chain, instructions or other communications from and/or to one or more members 15, or communications from the database 30. The network 20 can include a completely wireless system, or alternatively, a combination of wireless and wired system components.

The product monitoring system 25 is associated with the products or commodities to be shipped between members 15, and is in communication with the database 30 via the network 20. The product monitoring system 25 includes one or more sensors 40 and a reader 45. The sensors 40 are assigned to the products to monitor time sensitive data, such as environmental conditions of the product and the surrounding atmosphere (e.g., temperature, humidity, shock/vibration, light, radiation, other atmospheric conditions such as ethylene content, etc.). The sensors 40 also can store product information (e.g., price, date of purchase, date and location of inception/harvest, weather conditions, environmental conditions, etc.) and monitor the location of the products. In some constructions, the sensors 40 can be located adjacent the products or directly attached to the products.

The sensors 40 are in communication with the readers 45 over the network 20, and are defined by active or semi-active or passive or semi-passive radio frequency identification ("RFID") sensors or transponders that retrieve and store information related to the products in the supply chain. The active RFID sensors 40 include a long-lasting internal power source that can generate a signal to the reader 45 over relatively long distances (e.g., 300 feet). The semi-active RFID sensors 40 are battery-assisted sensors that detect parameters of the product, and have the ability to power down (e.g., a sleep mode) to conserve battery power. The passive RFID sensors 40 draw power from the readers 45. In other constructions, other sensors can be used to sense parameters of the product (e.g., ultra-high frequency sensors, etc.).

Each reader 45 is in communication with one or more of the sensors 40 to receive and process the sensed data according to parameters established by the members 15. The reader 45 can be in wireless or wired communication with the sensors 40, and can be separate or integrated with the sensors 40. An antenna (not shown) can be used to communicate the data from the sensors 40 to the reader 45.

The database 30 is in two-way communication with at least some of the members 15 via the network 20 such that the members 15 can input predetermined parameters or conditions into the database 30 (e.g., product characteristics, environmental parameters, etc.), and retrieve data from the database 30. In other words, the members 15 who are in two-way communication with the database 30 have read access to the database 30 and are able to manipulate data in the database 30. Communications between other members 15 and the database 30 may be one-way communications (i.e., the members 15 have read-only access to the database 30).

The database 30 is programmed with initial setpoint values or predetermined conditions for a particular product based on the predetermined conditions. These predetermined conditions can include a minimum temperature, a maximum temperature, an acceptable humidity range, and maximum shock or vibration that can be adequately sustained by the products. The database 30 also can include additional predetermined conditions (e.g., other atmospheric conditions, light, etc.) based on the type of product to be shipped.

A controller or microprocessor 50 is in communication with the database 30 and the readers 45 via the network 20 to receive one or more signals from the readers 45 that are indicative of the sensed or monitored data, and to deliver the sensed signals to the database 30 for storage and retrieval. In some constructions, the product monitoring system 25 and the process control system 35 are incorporated into the controller 50. The controller 50 is further in communication with the database 30 to compare the sensed conditions of the products with the predetermined conditions stored in the database 30 to determine whether the products are within the predetermined parameters established by the members 15.

The controller 50 includes application software that uses data collected from the sensors 40 to determine an approximate shelf life of the product. The application software is accessible by the members 15 via the network 20, and includes one or more shelf life prediction algorithms 55 to analyze product historical data, current data, and future or expected conditions that may impact the product, and to establish an estimated or approximate shelf life for the product. The historical data can include environmental conditions present during harvesting such as weather patterns, temperature, humidity, and the like. The expected conditions are based on the environmental conditions, the location, and other data associated with the product that can be used to accurately predict future product conditions. In some constructions, additional algorithms 60 can be used to determine other important factors or characteristics related to the product.

The controller 50 also includes a response system 65 that generates an automated signal or alarm to each appropriate member 15 with a particular interest in the shipped product in response to sensed conditions that exceed the predetermined conditions. The automated signal can trigger configurable responses including, but not limited to, delaying shipment of the product to determine possible damage to the product in response to the out-of-range or adverse condition. The automated signal generated by the controller 50 can also deliver instructions to various members 15 regarding whether the product should be returned, or whether the product can continue within the supply chain to be delivered to the receiver.

The management system 10 illustrated in FIG. 1 shows members 15 such as the suppliers (e.g., grower, manufacturer, etc.), the packaging and processing centers, the transportation systems (e.g., truck and trailer, airlines, railroads, ship, etc.), the distribution centers, and the receivers linked to each other and to the database 30 via the network 20. Generally, the network 20 links the members 15 of the management system 10 to each other and to the database 30 to enable communication between the members 15 and the database 30, and between the members 15. As discussed in detail below, the network 20 facilitates communication of product data and decision-making between members 15 in the management system 10. The network 20 further enables control and monitoring of the products, the process of product delivery, and the personnel within the management system 10 to assure adherence to specific criteria and to optimize product quality.

In operation, the network 20 is in communication with the product monitoring system 25 and the database 30 to provide communication between components of the product monitoring system 25, between the product monitoring system 25, the database 30, and the controller 50, and between the members 15. The sensors 40 sense various parameters of the products in the supply chain and deliver signals indicative of the sensed parameters to the readers 45 over the network 20. The readers 45 read the sensed parameters from the sensors 40, and process the data according to the parameters established by the members 15. Each reader 45 communicates respective signals indicative of the sensed parameters to the controller 50. The signals received by the controller 50 are stored as data in the database 30 and compared with the predetermined conditions to determine whether an out-of-range condition exists.

The controller 50 can initiate the response system 65 to generate a corresponding alarm to one or more members 15, and to delay or return the product, if necessary, in response to a sensed out-of-range condition. In some constructions, the controller 50 can operably determine a response to the sensed conditions and can communicate the response to the database 30 and/or to the members 15. In other constructions, the database 30 can operably determine a response to the sensed conditions received from the readers 45 and the controller 50, and can communicate the response to the members 15 via the network 20.

The controller 50 determines the shelf life and other expected characteristics of the product based on the sensed conditions and prior, historical conditions stored in the database 30 using the shelf life prediction algorithms 55 and/or the additional algorithms 60. The shelf life information associated with particular products is stored in the database 30 and is accessible by members 15 via the network 20. The predicted shelf life can be a specific date on which the product is expected to expire, or alternatively, the shelf life can be a period of time in which the product is predicted to remain viable. In some constructions, the controller 50 can automatically generate a report containing the shelf life information. The controller 50 can also generate reports containing the shelf life information in response to requests from members 15. In these constructions, additional information can be included in the reports (e.g., sensed conditions of the product, product information, product location, historical data, etc.).

Often, products are stored and/or transported on pallets or other storage and shipment devices (e.g., packages, containers, consignment for transport, etc.). A unique sensor 40 is assigned to each pallet or a group of pallets to identify the products on the pallet or pallets. For example, the sensor 40 can be assigned to a particular pallet by the supplier when the product is harvested or manufactured. Alternatively, the sensor 40 can be assigned to the pallet when the product is prepared for shipment or transport from the supplier to other members 15 in the supply chain. The supplier or another member 15 can input the identity of the product and any other related information (e.g., weather conditions during harvest, manufacturing conditions, etc.) into the sensor 40 when the sensor 40 is assigned to particular product. In some constructions, each sensor 40 can be assigned to a particular type of product and/or package and/or container and/or consignment for transport.

In some constructions, a data storage device or bar code 42 can be assigned to each product on a pallet or in a container to store static information related to the product. Generally, the bar codes 42 are two-dimensional bar codes that include information related to the origins of the product on which the bar code is affixed (e.g., directly to the product or on product packaging, etc.), and other relevant information. In other constructions, the bar codes 42 may include other data storage devices (e.g., RFID tags, etc.). Hereinafter, the term "bar code" shall be used to represent all such data storage devices and shall not be construed to limit the invention's application solely to two-dimensional static bar codes. The information can be downloaded or input or encoded in the bar code 42 at any point in the supply chain, and further can be attached to the products at any point in the supply chain (e.g., by a farmer, manufacturer, etc.). For example, the information may be encoded in the bar code 42 when the product is harvested or manufactured.

One sensor 40 may be assigned to one or a plurality of bar codes 42 associated with a corresponding number of products on a pallet. In some constructions, more than one sensor 40 may be assigned to a particular bar code 42. Some bar codes 42 are no longer associated with the assigned sensor 40 after the products are separated from the pallet with which the sensor 40 is in communication. Generally, the data or information collected by the sensor 40 that is related to the removed bar coded product is nested or stored in the database 30, and is associated or linked in the database 30 with the assigned bar code 42 that is now separated from the sensor 40. As a result, the conditions or parameters sensed by the sensors 40 can be associated or linked to the bar code(s) 42 via the database 30, and can be recalled by one or more members 15.

When the sensor 40 is assigned to the bar code 42 on a particular product, the assignment information between the sensor 40 and the bar code 42 is stored in the database 30 for retrieval by the members 15. For example, when products are initially placed in the supply chain, one or more sensors 40 are assigned to the bar code 42 corresponding to a particular product. When a product is separated from the first assigned sensor 40, one or more additional sensors 40 may be used to sense conditions and parameters associated with the product. The sensed information, as discussed above, is stored in the database 30. In order for the stored information related to a particular product to be recalled by one or more members 15, the additional sensors 40 are also assigned to the bar code 42.

Each bar code 42 is a static information storage system that includes information related to the corresponding product as of the date on which product information was entered or encoded in the bar code 42. The conditions to which the product is subjected to after the information is encoded in the bar code 42 are generally not included in the information stored in the bar code 42. In some constructions, writable or rewritable bar codes may be used to allow additional information to be encoded in the bar code 42. Generally, the information that is encoded in the bar code 42 allows substantial information related to the product, including historical information, to be accessed via the database 30. The association between the sensors 40 and the bar codes 42 in the database 30 allows the receiver to better manage inventory, and allows an end user or consumer to make a more reliable purchasing decision.

Each bar code 42 represents or identifies a particular product to which the bar code 42 is associated. The bar code 42 may include only an identifier, or may include a part of or a complete history of the product from the product's inception or harvest, including environmental conditions, the time period between inception and delivery to the receiver, and other parameters that are measured by the corresponding sensor 40. Each bar code 42 provides a link within the database 30 to information related to the product that was sensed by one or more sensors 40, and to information related to the shelf-life of the product for access by a consumer or a receiver.

In some constructions, the shelf life information may be accessible by accessing the database 30. For example, when a consumer purchases a package of apples with the bar code 42 affixed to the package, the consumer or the receiver can use an input device or bar code scanner to scan the bar code 42 and determine the estimated shelf life for the apples. Alternatively, a user can input the number or label associated with the bar code 42 to determine the estimated shelf life. The scanner is in communication with the database 30 via the network 20 so that the information sensed by the sensors 40 and assigned to the bar code 42, and therefore assigned the bar coded product, can be accessed using the bar code 42. As a result, product information gathered throughout the supply chain can be accessible using the bar codes 42 as an identifier within the database 30.

In other constructions, the shelf life information may be directly encoded in the bar code 42, and can include the date on which the information from the sensor 40 was encoded in the bar code 42. The consumer can calculate the remaining shelf life based on this encoded date. Alternatively, the bar code scanner may be programmed to calculate the remaining shelf life based on the information scanned from the bar code 42.

The readers 45 communicate with the sensors 40 to capture information or data related to the products (e.g., product type, conditions of the product, etc.) and to deliver the information to the database 30 via the network 20. The algorithms 55, 60 used by the controller 50 measure the quality of the products by estimating or predicting the shelf-life of the products as well as other data related to the products. Communication of product information from the readers 45 to the database 30 occurs throughout the shipping process to provide up-to-date, near real-time data regarding the quality of the products. The sensors 40 are read by the reader 45 continually or at predetermined intervals. The controller 50 uses the algorithms 55, 60 to update the shelf-life calculations based on the most recent data, and stores the updated calculations in the database 30.

The process control system 35 includes predetermined process controls and monitoring procedures 70, personnel management 75, security monitoring systems 80, and product monitoring systems 85. The predetermined process controls 70, the personnel management 75, the security monitoring systems 80, and the product monitoring systems 85 are implemented within the management system 10 at each step in the supply chain to regulate the quality of the product to be delivered to the receivers.

Generally, the process controls 70 include work flow, timing, and qualitative measurements of the products. The suppliers (e.g., farmers or growers, manufacturers, etc.) implement the process controls 70 to provide a product that has relatively high quality to the receiver. A farmer can use certified processes to effectively manage the harvest of perishables from a farm. A manufacturer can use certified processes to produce products that have dependable, homogenous features or characteristics (e.g., consistent paint color, chemical composition, etc.). Auditors or other similar personnel can be used to conduct random audits and to post findings or audit reports in the database 30 for access by other members 15 in the management system 10. The information in the audit findings can be reviewed by appropriate members 15 to establish conformity with standard operating procedures that were previously agreed upon by each member 15.

The packaging and processing centers include the process controls 70 to regulate products received from the supplier. Similar to the supplier, the packaging and processing centers can be subjected to audits by auditors to determine whether the processes conform to established operating procedures. The determinations by the auditors are entered into the database 30, and can be viewed by enabled members 15.

The process controls 70 implemented by the transportation systems can be used to determine how products should be arranged during shipment to maintain parameters of the goods within the predetermined conditions stored in the database 30. For example, a certified process can be implemented to establish certain criteria or operating parameters regarding how pallets of products are loaded onto a truck or other transport vehicle. The certified process prevents products from being loaded in a way that reduces airflow around the product, which can cause the environmental conditions of the products to differ from the predetermined conditions, and which may impact the shelf life of the product.

In some constructions, electronic curtains (e.g., laser curtains, radio frequency curtains, etc.) can be installed in the shipping compartment (e.g., container, cargo hold, etc.) of the transport vehicle. The electronic curtains can be dynamically implemented based on the product being transported to ensure adequate regulation of the product conditions and to avoid any variations from the desired predetermined conditions. The products are loaded into the shipping compartment such that a constant, unbroken electronic curtain is maintained. The management system 10 can deliver a message or report to an operator of the vehicle that indicates whether the electronic curtain has been broken. Based on the parameters of the process controls 70, the products cannot be shipped to a subsequent destination until all electronic curtains have been maintained.

The distribution centers can utilize the process controls 70 to direct loading and unloading products from the transport vehicles. The process controls 70 also regulate storage of the products in warehouses or other storage areas. Similar to the process controls 70 discussed above with regard to the suppliers and the transportation systems, the process controls 70 include processes to audit the distribution centers so that the distribution centers within the management system 10 are in compliance with standard operating procedures. The results or findings of the audits are stored in the database 30 (e.g., as audit reports) for future reference by members 15 of the management system to facilitate training and certification of products and assets (e.g., refrigeration systems, heating systems, etc.) in the supply chain.

The process controls 70 may also be used to monitor product loads (e.g., individual pallets, transport units, etc.) that are left unattended by the transportation systems. For example, the sensors 40 or other sensors may include an audio and/or visual alarm that communicates a detrimental condition affecting the products on which the sensors 40 are affixed. The sensors 40 can send out the alarm directly (e.g., to the area surrounding the products), or through the network 20 to one or more members 15 via the controller 50 and the database 30 similar to the alarms generated by the response system 65. In some constructions, the alarm can be generated by the sensors 40 when the sensors 40 have not been read by the readers 45 for a predetermined period of time. In other constructions, the alarm may be generated by the sensors 40 when the sensors 40 detect adverse conditions (e.g., high temperature, low humidity, high humidity, etc.) adjacent to the products that are being monitored.

The personnel management 75 is similar for each member 15 with access to the management system 10, and regulates access to the products and/or facilities, and to information related to the products through an access control system controlled by the controller 50. The access control system stores information related to each member 15 (e.g., certifications, employee information, etc.) in the database 30 to regulate access to the products and information related to the products. The access control system provides dynamic scheduling of personnel to allow changes to or modification of personnel access privileges to the products and/or facilities (e.g., access to some but not all bays at a warehouse, etc.) in the supply chain. Personnel access privileges are maintained in the database 30 for access by members 15 with appropriate credentials.

Generally, the personnel management 75 generates reminders or alarms related to re-certifications and training for each member 15 based on the information stored in the database 30. The members 15 are trained and certified such that the products are handled in each phase of the supply chain according to predetermined operating parameters that are defined by the process control system 35. With regard to the suppliers, personnel can be certified to harvest or produce products according to the corresponding predetermined operating parameters. With regard to the processing centers and distribution centers, personnel can be certified to handle, process, and store products according to associated predetermined operating parameters. Transportation systems personnel can be trained and certified to control loading and unloading of products from the transport vehicles, and to maintain the products at the desired predetermined conditions (e.g., temperature, humidity, air quality, etc.).

The training and certification reminders are delivered to respective members 15 based on a predetermined schedule. For example, the reminders can be delivered to members 15 thirty days prior to expiration of certification. The personnel management 75 also includes controls that propose future training and re-certification processes to the members 15 so that certification of each member 15 can be effectively maintained. In some constructions, the personnel management 75 can also include an automated time and attendance system to calculate the time that particular personnel have worked with or handled the products. The personnel management 75 uses the information gathered by the time and attendance system to determine payroll consequences, and to calculate the cost associated with the products (e.g., harvesting, manufacturing, storing, shipping, moving, etc.).

In some constructions, the personnel management 75 can schedule certain personnel for predetermined tasks based on configurable requirements. Generally, these requirements are based on the products that are being handled. The personnel management 75 matches products with personnel who have skill sets that are appropriate for handling or dealing or testing the products. The personnel management 75 may also include other relevant information (e.g., labor agreement rules, overtime policies, personnel information, etc.) that is relevant to the predetermined tasks. For example, when a shipment of meat arrives at a distribution center, the personnel management 75 can schedule one or more meat inspectors or meat quality control personnel to inspect the products and to make a determination as to the product condition. In this example, the personnel management 75 does not schedule fruit or vegetable inspectors or related quality control personnel. The personnel management 75 can result in substantial cost savings related to personnel, including, but not limited to, overtime costs and down time.

The security monitoring system 80 generally relates to security of the facility or transport vehicle containing the products so that the products are not subjected to adverse conditions that reduce the shelf life or quality of the products. The facilities of suppliers, processing centers, and distribution centers are secured using video surveillance, access systems, and security personnel. In some constructions, additional security monitoring features may be used to secure the products. Similar to other processes in the management system 10, the security monitoring system 80 operates based on predetermined operating parameters established by one or more members 15 via the process control system 35, or by other entities (e.g., customs officials, etc.). The facilities are periodically certified to ensure compliance with the predetermined operating procedures. Facilities that have been certified are considered "trusted" or "secure" facilities.

The security monitoring system 80 utilized by the transportation systems includes monitoring systems within the shipping process that are integral to maintaining the products at the predetermined conditions (e.g., refrigeration systems, heating systems, humidity systems, air quality control systems, vibration-resistance systems, etc.). Access to components or assets of these systems by certified personnel is restricted using the access control system to ensure that predetermined operating parameters related to the systems are followed. An electronic verification system is incorporated into the security monitoring system 80 to allow operation of the components by designated or authorized personnel.

The assets can include electronic controls that generate alarms in response to violation of one or more predetermined operating procedures or conditions. The electronic controls also can generate alarms in response to the assets not operating in a desired state. Generally, the alarms are delivered to the controller 50 and the database 30 for corrective action to address the alarm condition. For example, a refrigeration unit on a truck can be used to maintain the products within a desired temperature range. Sensors 40 attached to or adjacent the products can detect hot spots or cold spots that may affect the shelf-life or quality of the products. As discussed above, the parameters measured by the sensors 40 are stored in the database 30. In response to the signals indicative of a hot spot or cold spot, the controller 50 delivers instructions to the electronic controls of the associated system asset to correct the undesired condition of the products (e.g., increase or decrease the temperature). If the component fails to correct the undesired condition, the controller 50 notifies the operator or manager of the transport vehicle to initiate corrective actions. These corrective actions can include repair or replacement of defective components, or other actions (e.g., returning the vehicle for maintenance).

The security monitoring system 80 for the transportation system also can include video surveillance to protect and secure the products being shipped within the carriers or vehicles. The security monitoring system 80 operates based on predetermined operating procedures or parameters established by one or more members 15, or by other entities (e.g., customs officials, etc.). The vehicles or carriers are periodically certified to ensure compliance with the predetermined operating parameters. Vehicles that have been certified are considered "trusted" or "secure" vehicles that are suitable for carrying products under the management system 10 and through the supply chain, and can receive expedited clearance at control points to facilitate quicker shipment of the products being carried through the supply chain.

The asset monitoring system 85 is in communication with the product monitoring system 25 to observe and control various product conditions throughout shipment of the product from the suppliers to the receivers. In some constructions, the asset monitoring system 85 is in communication with the database 30 to monitor and control product conditions. The suppliers track information related to producing the products using the asset monitoring system 85. For example, a grower can monitor environmental conditions (e.g., weather patterns, ambient temperature, humidity, etc.) after the products have been harvested. The processing centers, the distribution centers, and the transportation system also track information related to product storage and transport at various points along the supply chain using the asset monitoring system 85. As discussed above, the data can be acquired by the asset monitoring system 85 through the product monitoring system 25 continuously or at predetermined intervals.

In some constructions (e.g., when product conditions are sensed at predetermined intervals), one or more members 15 can manually request product information or data from the product monitoring system 25 using the asset monitoring system 85 at any time during shipment of the product through the supply chain. The acquired data is stored in the database 30 for access by appropriate members 15 over the network 20, and can be used by the appropriate members 15 to selectively alter the conditions to which the product is subjected.

In other constructions, product conditions can be automatically altered using the asset monitoring system 85 without direct human intervention. In these constructions, the asset monitoring system 85 is a smart asset system that allows automatic control of product conditions by the assets within the supply chain (e.g., display cases, merchandisers, transport units, warehouse storage units, etc.) based on historical and near-real time sensed conditions without direct initiation by the members 15. These assets can monitor product conditions throughout the supply chain using the asset monitoring system 85, and can control the conditions of the product by selectively varying the conditions to which the product is being subjected to optimize the quality of the product.

At least some of the members 15, and in some constructions any member 15, in the supply chain have access to near real-time product data, and can make logistics decisions based on the data stored in the database 30. Logistics decisions can include whether the products should be abandoned, whether the vehicle and the products in the vehicle should be routed to a destination different from the original destination (e.g., to increase sales of the products), and whether the products should be returned to a particular member 15 in the supply chain. Additional logistical decisions that can be made by certain members 15 (e.g., processing centers, distribution centers, etc.) include inventory management (e.g., first-to-expire products shipped out first), and arrangement of replacement delivery to avoid out-of-stock products at the receivers.

Generally, the members 15 determine measurable and controllable parameters to monitor and regulate based on the type of product to be shipped. These parameters are stored in the database 30 for access by members 15 to facilitate comparison of the parameters with existing processes, and for future retrieval and updates. The stored parameters can affect the process controls 70, the access control systems, the security monitoring systems 80, as well as other systems in the management system 10. For example, instead of a first product in, first out ("FIFO") business practice, members 15 can utilize a first product expiring, first out ("FEFO") business practice to ensure customer satisfaction and optimization of profit margins.

The management system 10 provides automated contingency planning within the supply chain. The data collected throughout the supply chain that is stored in the database 30 allows members 15 to optimize inventory turns and profitability and to avoid supply bottlenecks. For example, when inventory turns are relatively slow at one or more receivers, products can be redirected during shipment to other receivers who have quicker or higher product inventory turns. Similarly, harvesters, manufacturers, and other members 15 can utilize the management system 10 to optimize profitability by supplying certain products to receivers who return the highest profit margins. Within the management system 10, product shipments can be redirected at any point in the supply chain to members 15 who may be able to return a higher return on investment for a particular product.

The management system 10 also provides the members 15 with the capability of closely monitoring food safety by providing detailed and effective quality control. By tracking products throughout the supply chain, members are better able to determine what product loads may need to be quarantined. The management system 10 facilitates better communication of the location of recalled products, and the member 15 who is in charge of the location at which the recalled products are located. The database 30 also provides information regarding the origins of the recalled products that allows quarantines to be more effectively and knowledgeably applied to limit additional adverse consequences.

The management system 10 also allows trading products (e.g., commodities) based on information collected from the time of the product's creation (e.g., harvest, manufacture). A trading system (not shown) such as a board of trade can be implemented by the management system 10 based on indicators within the supply chain (e.g., the shelf life prediction algorithms 55). The trading system includes products that are being shipped to a member 15 (e.g., broker, etc.) located in the supply chain, but who may not be an end destination such as a receiver. The trading system allows the broker to purchase products from a producer (e.g., a farmer or manufacturer), and to sell the products to bidders in a futures market based at least in part on product conditions monitored during the progress of the products through the supply chain. For example, the price of agricultural products can be set based on environmental conditions and other conditions in existence during and after the growing season. The receivers and other members 15 can bid on the products through the management system 10 and the trading system to secure or acquire the desired quantity and quality of products from the brokers. The trading system can be adapted to provide very accurate product price controls based on the extensive product information collected by the management system 10, and allows members 15 to deliver high quality goods to receivers and/or consumers who pay a premium price for such goods.

In some constructions, the management system 10 can be accessible by consumers through an online access system so that the consumers can track the history and shelf life of one or more products. In these constructions, the database 30 is available to consumers through the online access system via a network (e.g., the Internet). The consumers can obtain access through the online access system to a website that allows the consumers to check for receivers who have certain products with desirable characteristics. The online access system can include a detailed history of the product from the product's inception to delivery to the receiver based on product information stored in the database 30. The online access system may also extend the availability of near real-time data for products by incorporating refrigerated display case temperatures at receiver locations while the product is on display. The members 15 can monitor and control access to the online access system to optimize the flow of goods from the source of the products to the receivers.

The products and personnel associated with the products are monitored and controlled throughout the supply chain to ensure delivery of high quality products to the receivers. The management system 10 monitors and controls each step in the supply chain to prioritize products and people in the process, and to effectively manage products within the supply chain. The management system 10 utilizes the network 20 to seamlessly track products throughout the supply chain, and to assist the decision-making process of members 15 with regard to the products at various spots in the supply chain. Certified processes, people, and facilities enable transportation and delivery of products effectively and quickly by minimizing delays at various points within the supply chain. The management system 10 also effectively tracks information related to the products from harvest and manufacture to receivers, and stores the information in the database 30 for access by the members 15. The database 30 retains the historical and real-time data for each product in the supply chain and tracked by the asset monitoring system.

Various features and advantages of the invention are set forth in the following claims.

The invention claimed is:

1. A method of operating a supply chain management system including a supply chain having a plurality of members, the method comprising:
   accessing by one or more of the plurality of members a database via a network;
   moving one or more commodities through the supply chain;
   assigning at least one sensor to the commodities;
   monitoring at least one condition of the commodities using the sensor;
   communicating data representative of the at least one condition of the commodities to the database via the network;
   enabling access to the database by a consumer via an online access system;
   tracking in near real-time at least one of a history and a predicted shelf life of the commodities using the online access system, the predicted shelf life being based on expected conditions associated with the commodities, and the expected conditions being defined by at least one of future environmental conditions and a destination of the commodity;
   generating an automated signal in response to commodity data exceeding predetermined parameters; and
   redirecting the commodity within the supply chain in response to the automated signal.

2. The method of claim 1, further comprising
   accessing the data in the database;
   verifying whether commodities with desirable characteristics are available via the online access system; and
   obtaining information from the database related to the location to which the commodities are intended to be delivered.

3. The method of claim 1, further comprising
   accessing the data in the database; and
   obtaining a detailed history of the commodities from inception of the commodities.

4. The method of claim 1, further comprising
   displaying the commodities at a retail location; and
   allowing access by the consumer in the retail location to near real-time data associated with the commodities that are on display at the retail location.

5. The method of claim 4, further comprising acquiring historical data associated with the commodities from inception to delivery.

6. The method of claim 1, further comprising managing access by the consumer to the online access system.

7. The method of claim 1, wherein the communicated data includes at least one of a historical condition of the commodity and a near-real time sensed condition of the commodity, the method further comprising automatically altering conditions of the commodity within the supply chain in response to the acquired data without direct human intervention.

* * * * *